A. R. LONG.
TWO-CYCLE ROTARY CYLINDER INTERNAL COMBUSTION ENGINE.
APPLICATION FILED JAN. 8, 1920.

1,350,260.

Patented Aug. 17, 1920.

INVENTOR.
Albert R. Long
BY Percy Hammond
ATTORNEY.

A. R. LONG.
TWO-CYCLE ROTARY CYLINDER INTERNAL COMBUSTION ENGINE.
APPLICATION FILED JAN. 8, 1920.
1,350,260.
Patented Aug. 17, 1920.
3 SHEETS—SHEET 2.
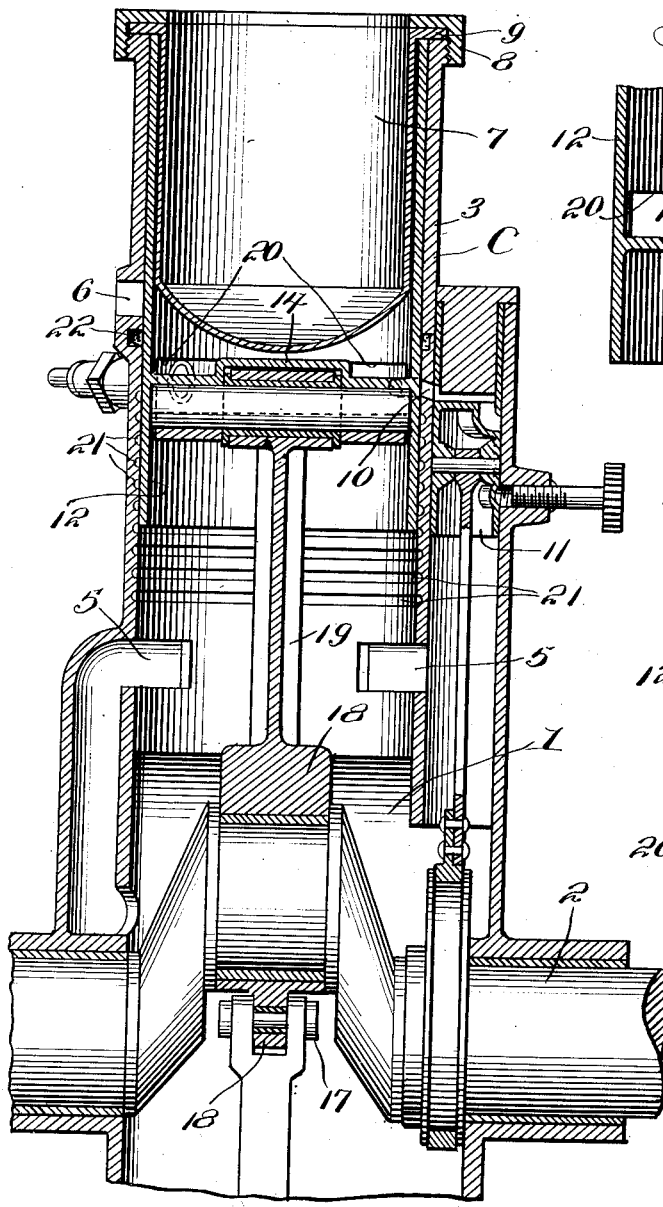
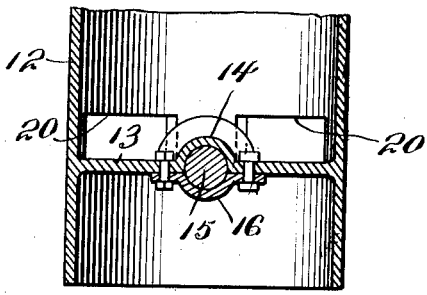
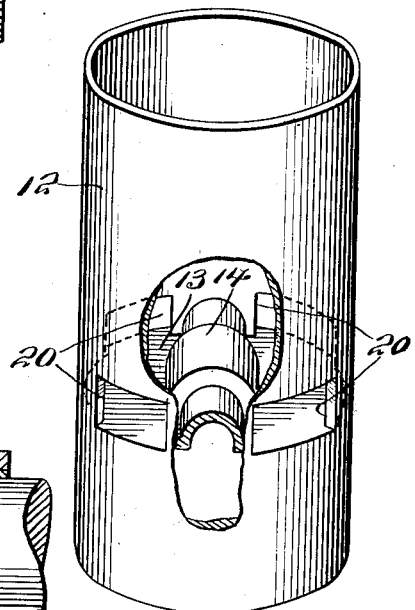
INVENTOR.
Albert R Long
BY Percy H. Moore
ATTORNEY.

A. R. LONG.
TWO-CYCLE ROTARY CYLINDER INTERNAL COMBUSTION ENGINE.
APPLICATION FILED JAN. 8, 1920.
1,350,260.
Patented Aug. 17, 1920.
3 SHEETS—SHEET 3.
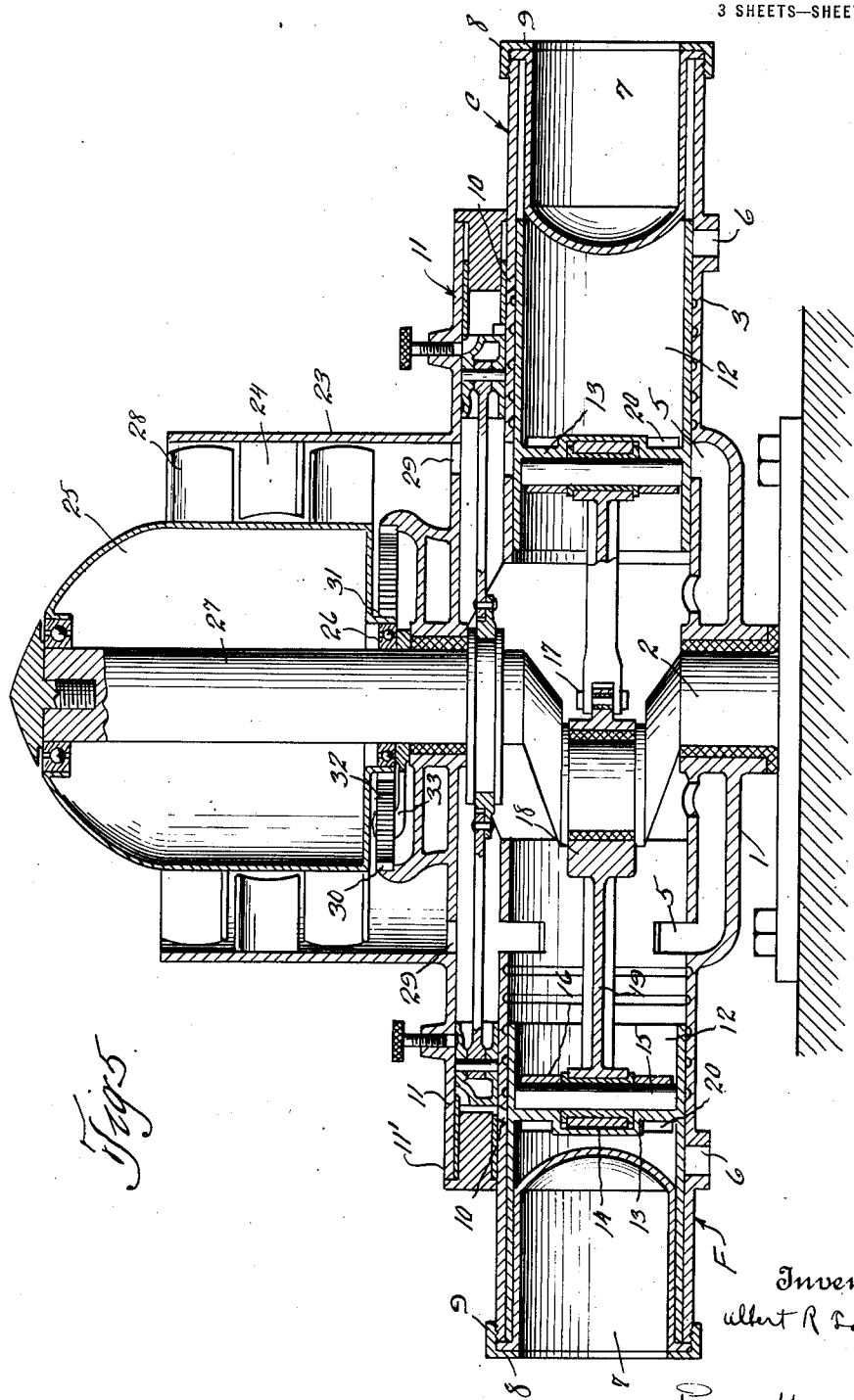
Inventor
Albert R. Long
By
Percy H. Moore
Attorney

UNITED STATES PATENT OFFICE.

ALBERT R. LONG, OF BALLSTON, VIRGINIA.

TWO-CYCLE ROTARY-CYLINDER INTERNAL-COMBUSTION ENGINE.

1,350,260.
Specification of Letters Patent.
Patented Aug. 17, 1920.

Application filed January 8, 1920. Serial No. 350,098.

*To all whom it may concern:*

Be it known that ALBERT R. LONG, citizen of the United States of America, residing at Ballston, in the county of Alexandria and State of Virgina, has invented certain new and useful Improvements in Two-Cycle Rotary-Cylinder Internal-Combustion Engines, of which the following is a specification.

The present invention has reference to improvements in two cycle rotary cylinder internal combustion engines and objects of the invention are to provide an engine wherein the cylinders are arranged in the most compact manner and constructed to produce an exceedingly light but strong structure, to provide a novel and efficient form of intake and exhaust means for the engine whereby said cylinders will be thoroughly and rapidly scavenged of all burnt or exhaust gases, and further to locate the exhaust means with relation to the intake means so as to permit of the full absorption of energy generated in the engine cylinders before the burnt gases resulting therefrom are exhausted.

Another of the objects of the invention is to arrange the intake and exhaust ports of the engine in such a manner as to give the greatest amount of port area without diminishing the length of the power stroke, also to permit an excess of air to pass through the cylinder thereby serving to cool said cylinder internally and therefore, allow practical and satisfactory use of a single thickness of cylinder wall.

A futher important characteristic feature of my invention may be stated to reside in the provision of means for forcing the cooling draft of air through the engine cylinder whereby to effect such cooling as heretofore mentioned, said means being operable by and with the engine proper.

Another and equally important object of the invention resides in the provision of pistons of the sleeve valve type for the engine, these pistons serving as liners for the cylinder walls proper to prevent detrimental effect thereon by the recurring explosions which take place in the cylinders.

It is also an object of my invention to provide the cylinders of the engine with an arrangement of oil receiving grooves for effecting spreading of the oil and in consequence, eliminate the drag and resultant material loss of power by the engine caused by "oil crowding" during functioning of the pistons.

Other objects will be in part obvious and in part pointed out hereinafter.

In order that the invention and its mode of operation may be readily understood by those skilled in the art, I have in the accompanying illustrative drawings and in the detailed following description based thereon, set out a preferred embodiment of the same.

In these drawings:

Fig. 2 is a vertical transverse section in detail through one of the engine cylinders and its respective piston;

Fig. 3 is an enlarged detail in section showing the connection between the piston and piston rod;

Fig. 4 is a perspective of the novel form of piston having a part broken away, and Fig. 5 is a vertical section through the engine, showing the arrangement of blowers for creating a forced cooling draft through the engine cylinders.

Figure 1:
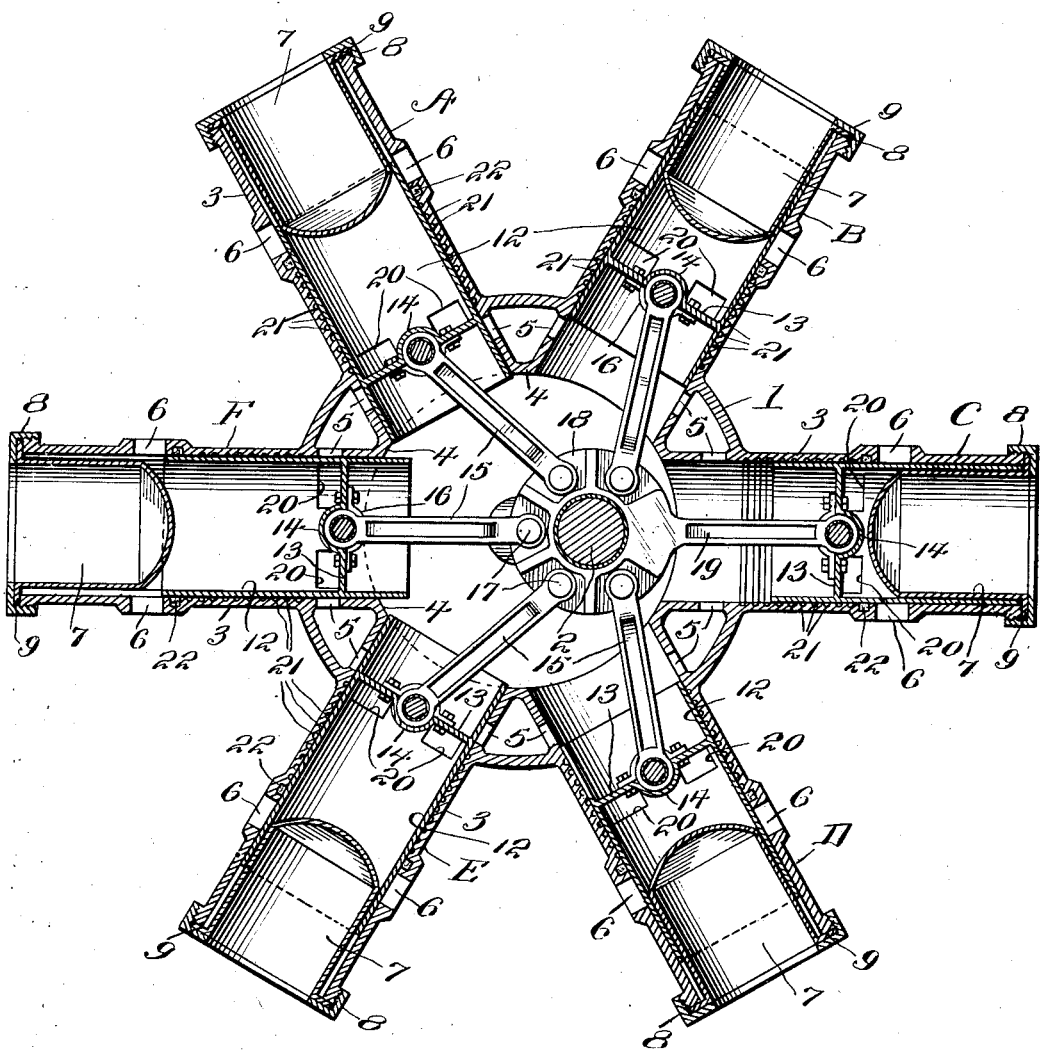
Figure 1 is a horizontal longitudinal section through the improved engine.

Having more particular reference to the drawings in connection with which like reference characters will designate corresponding parts throughout the several views thereof, 1 represents the circular crank case of the engine through which the power or driving shaft 2 passes. Cylinders, generally indicated by the numeral 3 are carried by said crank case and are radially disposed with relation thereto, these cylinders being preferably formed of aluminum or a similar metal and having their inner ends extending into the case and interconnected as at 4; circumferentially disposed ports 5 being formed therein for allowing the entrance of air into the sleeve valve pistons, hereinafter described, and the cylinders 3. Exhaust ports 6 are also formed in the cylinders in proximity to the outer-ends thereof whereby to permit of exhaustion of the burnt gases and the scavenging of said cylinders, it being noted in this connection that these ports 6 are disposed in spaced relation about the circumference of the cylinders, thus, allowing for a rapid exit of spent gases and the currents of cooling air passing therethrough.

As means for closing the outer-ends of each of the cylinders 3, I provide heads 7, which, as will be noted, are of diameters less than that of their respective cylinders, thus, providing circular ways between the same and the adjacent walls of the cylinders in order that entrance of the sleeve pistons hereinafter described, therebetween may be effected. Flanged screw-threaded closure rings 8 are engaged with the outer ends of each of the cylinders 3 and clampingly engage the heads 7, which carry circular flanges 9 on their adjacent ends and bear on the ends of their respective cylinders, thereby serving to secure the cylinders' heads against movement and insuring proper functioning upon occurrence of explosions in the cylinders. These heads, however, may be readily and quickly removed from their respective cylinders when desired, as in the event of cleaning or repairing the cylinders or their pistons.

As means for allowing introducing of fuel into the firing chambers of the engine cylinders ports 10 of less size than the exhaust ports 6 are formed in the cylinders at points spaced inwardly from said exhaust ports and are supplied with a form of control means designated in its entirety by the reference character 11 located in valve cylinders 11' to one side of each of the cylinders and more fully described and claimed in a copending application for U. S. Letters Patent, Serial No. 350,097, filed January 8, 1920.

Slidable in each of the cylinders 3 are pistons 12 preferably formed of steel tubing and of a size such as to insure snug reception in said cylinders; heads 13 being engaged in the inner ends of said pistons and having bearings 14 sunk therein for the reception of the bearings of connecting rods 15, over which bearing clamps 16 are engaged and secured to adjacent portions of the heads 13 by suitable means. It, of course, will be appreciated that the remaining ends of the connecting rods 15 are pivoted at 17 to the collar 18 of the "mother" connecting rod, which, for the purpose of identification, may be referred to by the numeral 19; this collar 18 engaging over the power shaft 2 as clearly shown in the Fig. 1.

Each of the pistons 12 are formed with circumferentially arranged ports 20 corresponding to the ports 5 in the inner ends of the cylinders 3 adapted to register at predetermined and recurring intervals therewith for permitting the flow of air from the crank case 1 into said cylinders.

As shown by actual test, the drag or friction caused by the shearing action of oil on the walls of the cylinders 3 and pistons 12 upon movement of the latter results in the loss of force or power, amounting to approximately 80% of the total loss caused by all other parts of the engine, including all accessories. To overcome this resistance as caused by the so called "oil crowding," I form on the outer surfaces of said cylinder walls, circumferentially disposed grooves or pockets 21 and in addition, mount packing rings 22 in circular ways also formed in the walls of said cylinders at points beyond the grooves 21. Such an arrangement affords an escape for the oil collected upon movement of the pistons and eliminates resistance to a material extent together with the shearing of the oil, inasmuch as said oil will be allowed to flow from one groove to another thus avoiding the rolling of the same. It should be further noted that the grooves 21 by receiving the oil will seal the piston and so, assist the packing rings 22 in the cylinders in maintaining pressure on the pistons against escaping.

To insure maintenance of a purging draft in the engine cylinders 3 whereby to effect rapid exhaustion of burnt gases from the same and also, to cool these cylinders, I provide a form of blower comprising an annular casing 23 carrying circularly disposed fan blades 24, and receiving therein a concentrically located hub 25 formed with bearings 26 at its inner and outer ends, which hub is loosely mounted for rotation on a vertical extension 27 of the crank shaft 2 carrying bearings corresponding to the bearings 26 and coöperating therewith. A locking screw is turned into engagement with the outer end of the extension 27 whereby to prevent displacement of the hub during rotation. A plurality of circularly disposed fan blades 28 are carried by the hub 27 and are arranged upon either side of the blades 24 being adapted to coöperate therewith to create a draft with the resultant purging and cooling draft through the engine cylinders; communication with said engine cylinders being established by forming ports 29 in the walls of the valve cylinders 11' at suitable points. To rotate the blades 24 and 28 in proper directions, an internal gear 30 is supported in the bottom of the casing 23, while a gear 31 is secured to the reduced inner end of the hub 25, these several gears 30 and 31 being interconnected by a pinion 32 mounted upon a bracket 33 immovably supported on the extension 27. Thus it will be seen that when the cylinders with their crank case 1 and the casing 23 carrying the blades 24 are rotated about the non-rotatable crank shaft, the pinion 32 will be rotated, and in turn will impart rotary motion, but in a direction opposite to that of the blades 24, thereby producing the desired draft for effecting the cooling and purging draft through the engine cylinders. Hence, when the exhaust cylinders are open, the passage of air therethrough from the blower will sweep all spent or burnt gases therefrom and at the same time, will cool said cylinders.

The type of piston above described while being particularly designed for use in rotary engines of aviation design, will also be found suitable for use in engines where the cylinders are vertical and below the crank case instead of above it and also by design to other types of engines.

The operation of my improved engine may be reviewed as follow: Explosions occur in sequential order in the cylinders, starting at the point indicated A with the intaking of a fresh charge of combustible material whereupon the piston moves into the cylinder on its compression stroke as at B reaching the limit of this stroke at C whereupon firing of the now highly compressed charge is effected, thereby driving said piston in an opposite direction or outwardly with respect to its cylinder as at D, imparting thereto the power stroke as shown at E, which stroke carries the piston to its outermost limit F, whereat the ports 20 in the piston aline with the ports 5 in the inner end of the cylinder and the exhaust ports 6 are fully exposed. At this time, the burnt gases in the engine cylinder will find exit through said ports 6, while a scavenging current of air will be passed through the alined ports 5 and 20 into the cylinder by means of the rotary blower for clearing the same of all burnt gases. Due to the circumferential arrangement of the ports 5, 6 and 20 it will be readily understood that rapid exhaustion of spent gases from the engine cylinders together with material lowering of temperature in the cylinders will be effected. Upon continued functioning of the piston, the exhaust ports 6 will be covered, thus trapping a quantity of fresh air in the piston sleeve and serving to render the gaseous charge delivered thereto highly combustible. Due to the arrangement of the cylinder heads in the various cylinders it will be seen that the sleeve or skirted portions of each of the pistons will be allowed to move into the annular spaces afforded. In this way, proper compression of the gases in the cylinders will be insured and further it will be appreciated that the energy liberated upon ignition of said gases will be directly imparted to the heads of the pistons, since these heads will be in positions adjacent the cylinder heads.

Particular stress is placed upon the arrangement of pistons, the same allowing the explosions of gases to take place therein; energy from such explosions being directed onto the head of the piston. Thus the walls of the cylinder receiving the piston will be strengthened and further wear thereon with the resultant play of the piston and loss of power will be avoided.

Manifestly, the construction shown is capable of considerable modification, and such modification as is within the scope of my claims, I consider within the spirit of my invention.

What I claim is:

1. A rotary multiple cylinder engine comprising a crank case and cylinders, said cylinders being radially disposed and having their inner portions extended into the engine crank case and formed with ports, the outer portions having intake and exhaust ports therein and sleeve valve pistons slidable in the cylinders for alternately controlling said intake and exhaust ports and having ports therein adapted to intermittently register with said first ports for supplying a scavenging current to the pistons and cylinders.

2. A rotary multiple cylinder engine comprising a crank case and cylinders, the inner ends of said cylinders extending into the crank case and having air ports therein, intake means in the cylinders, exhaust means in the cylinders beyond said intake means, sleeve valve pistons working in said cylinders, provided with ports on their inner portions registerable with the air ports, heads engaged in the sleeves of said pistons, said pistons adapted to alternately control the intake and exhaust means.

3. A rotary engine having an air intake, a cylinder having its inner end communicating with said air intake, exhaust means in said cylinder, a piston working in said cylinder including a sleeve having ports therein for controlling communication between the cylinder and the air intake, and a head engaged therewith adjacent said ports, said piston forming a liner for the cylinder and serving to alternately control the cylinder intake and exhaust means.

4. A rotary engine having an air intake, a cylinder communicating with said air intake, exhaust means in said cylinder, a piston working in said cylinder including a tubular sleeve having ports therein for establishing communication between the cylinder and air intake immediately subsequent to the working stroke for supplying a scavenging current of air to the sleeve and cylinder, a head engaged in said sleeve adjacent the ports, said piston providing a liner for the cylinder and serving to alternately control the cylinder intake and exhaust means.

5. A rotary engine having an air intake, a cylinder having the inner end thereof extended into said air intake and formed with air ports, a piston working in said cylinder including a tubular sleeve having ports therein registerable with said air ports, and a head engaged in the sleeve adjacent the ports in the same, said piston forming a liner for the cylinder and serving to alternately control the intake and exhaust means of the cylinder.

6. A rotary multiple cylinder engine having an air intake, cylinders having their inner ends extended into said air intake and formed with ports, intake means in the cylinders, exhaust means in the cylinders beyond said intake means, heads engaged in the ends of said cylinders extending thereinto and spaced from the cylinder walls to form annular ways between the same, pistons working in said cylinders including tubular sleeves provided with ports therein registerable with said first ports for supplying scavenging currents of air to the cylinders and sleeves, said pistons forming liners for their cylinders and serving to alternately control the intake and exhaust means.

7. A rotary multiple cylinder engine comprising a crank case and cylinders, said cylinders communicable with the crank case and provided with intake and exhaust means, heads engaged in said cylinders and extending into the same, the adjacent surfaces of said heads and cylinders being spaced to form annular ways, and pistons working in said cylinders comprising tubular sleeves and heads engaged in said sleeves inwardly from their outer ends, said pistons controlling communication between the cylinders and crank case to permit intermittent introduction of scavenging currents into the latter, and serving to alternately control the intake and exhaust means of said cylinders.

In testimony whereof I affix my signature in presence of two witnesses.

ALBERT R. LONG.

Witnesses:
 EDNA J. SHEEHY,
 K. L. MILLS.